US008587249B2

(12) United States Patent
Sone

(10) Patent No.: US 8,587,249 B2
(45) Date of Patent: Nov. 19, 2013

(54) POWER UNIT FOR ELECTRIC VEHICLE

(75) Inventor: Toshihiro Sone, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 13/353,878

(22) Filed: Jan. 19, 2012

(65) Prior Publication Data

US 2012/0187755 A1 Jul. 26, 2012

(30) Foreign Application Priority Data

Jan. 21, 2011 (JP) ................ P2011-010585

(51) Int. Cl.
H02P 27/04 (2006.01)
H02P 23/00 (2006.01)
G05F 1/00 (2006.01)
B60L 3/00 (2006.01)

(52) U.S. Cl.
USPC ........... 318/800; 318/504; 323/272; 323/285; 307/9.1

(58) Field of Classification Search
USPC ............. 318/504, 800; 323/272, 285; 307/9.1
See application file for complete search history.

(56) References Cited

U.S. PATENT DOCUMENTS

| 8,297,389 | B2 * | 10/2012 | Takizawa ................. 180/65.265 |
| 2008/0315803 | A1 * | 12/2008 | Yonemori et al. ............ 318/148 |
| 2009/0033257 | A1 * | 2/2009 | Sato et al. .................. 318/400.3 |
| 2010/0140002 | A1 * | 6/2010 | Miura et al. ............. 180/65.285 |
| 2011/0011658 | A1 * | 1/2011 | Takizawa ................... 180/65.31 |
| 2011/0012543 | A1 * | 1/2011 | Takizawa et al. ............. 318/139 |
| 2011/0095603 | A1 * | 4/2011 | Lee et al. ..................... 307/10.1 |
| 2012/0187755 | A1 | 7/2012 | Sone |
| 2012/0187887 | A1 * | 7/2012 | Sone ............................ 318/504 |

FOREIGN PATENT DOCUMENTS

| JP | 08-214410 A | 8/1996 |
| JP | 2000-324710 A | 11/2000 |
| JP | 2001-136607 A | 5/2001 |
| JP | 2006-180658 | 7/2006 |
| JP | 2007-274830 A | 10/2007 |
| JP | 2007-282485 A | 10/2007 |
| JP | 4353093 B2 | 8/2009 |
| JP | 2010-104165 A | 5/2010 |
| JP | 2010-104169 A | 5/2010 |

OTHER PUBLICATIONS

Japanese Office Action, Application No. 2011-010584 mailing date Jan. 8, 2013.
Japanese Office Action, Application No. 2011-010585 mailing date Jan. 8, 2013.
U.S. Appl. No. 13/354,082, Office Action dated Apr. 17, 2013.

* cited by examiner

Primary Examiner — Eduardo Colon Santana
Assistant Examiner — Gabriel Agared
(74) Attorney, Agent, or Firm — Arent Fox LLP

(57) ABSTRACT

A power unit for an electric vehicle includes: a first power source connected between a first node and a second node; a first switch connected between the second node and a third node; a second power source connected between the third node and a fourth node; a second switch connected between the first node and the third node; and a DC-DC converter, wherein the DC-DC converter adjusts an electric potential of the first node by changing an electric potential of the second node by making the first node connectable to the third node, or, by making the second node connectable to the third node; an output electric power obtained from between the first node and the fourth node is supplied to an electric motor; and the first power source or the second power source is a fuel cell stack and an another is a secondary battery.

5 Claims, 12 Drawing Sheets $$\frac{V1}{Vfc} = 1-duty$$
$$\rightarrow V1 = (1-duty) \cdot Vfc$$

$$\frac{V1}{(V1+Vb)} = 1 - duty$$

$$\rightarrow V1 = \left(\frac{1}{duty} - 1\right) \cdot Vb$$

$$\frac{V1}{(V1+Vb)} = 1-\text{duty}$$

$$\text{duty} = \frac{Vb}{(Vfc+Vb)} \rightarrow V1=Vfc$$

$$\frac{Vb}{Vfc} = 1 - duty$$

$$\rightarrow V2 = \left(\frac{duty}{1-duty}\right) \cdot Vb$$

$$\frac{Vb}{(Vb+V2)} = 1-\text{duty}$$

$$\rightarrow V2 = \left(\frac{1}{\text{duty}} - 1\right) \cdot Vb$$

POWER UNIT FOR ELECTRIC VEHICLE

TECHNICAL FIELD

The present invention relates to a power unit for an electric vehicle.

Priority is claimed on Japanese Patent Application No. 2011-010585, filed Jan. 21, 2011, the content of which is incorporated herein by reference.

BACKGROUND ART

Conventionally, a power source system is known which includes a single DC-DC converter for a battery circuit. This battery circuit is configured so that a fuel cell stack and an electric storage device are connected in series. According to the above conventional power source system, a switching is performed between a plurality of operation modes by adjusting the electric power supply ratio between the fuel cell stack and the electric storage device by altering a switching duty of the DC-DC converter. (See, for example, Japanese Unexamined Patent Application, First Publication No. 2010-104165.)

DISCLOSURE OF INVENTION

Incidentally, according to the power source system based on the conventional technology described above, when the power source system is mounted on a large vehicle, for example, and the power output of the fuel cell stack and the electric storage device is increased, the connection in series voltage increases as well. As a result, there is an increase in the switching loss of the inverter of the motor driving the vehicle. Thus, when the vehicle is traveling in a high-torque cruising mode, during a starting of the vehicle on a hill, for example, an output restriction might occur in order to prevent the inverter from overheating.

The present invention is made according to such considerations. An object of the present invention is to provide a power unit for an electric vehicle which can maintain a predetermined output while restraining a loss in a high-voltage system.

In order to solve the above problem, a power unit for an electric vehicle employs the following configuration:

(1) An aspect of the present invention is a power unit for an electric vehicle including a first power source connected between a first node and a second node; a first switch connected between the second node and a third node; a second power source connected between the third node and a fourth node; a second switch connected between the first node and the third node; and a DC-DC converter connected to the second node. Here, the DC-DC converter adjusts an electric potential of the first node from the second node via the first power source by changing an electric potential of the second node by making the first node connectable to the third node, or, changes the electric potential of the second node by making the second node connectable to the third node. In addition, an output electric power obtained from between the first node and the fourth node is supplied to an electric motor. Further, one of the first power source or the second power source is a fuel cell stack and an another one of the first power source or the second power source is a secondary battery.

(2) The power unit for the electric vehicle may be configured as follows: the power unit further includes a switching unit switching between a first connected condition, a second connected condition, and a third connected condition. In the first connected condition, the first node is connected with the third node by opening the first switch and closing the second switch. In the second connected condition, the second node is connected with the third node by closing the first switch and opening the second switch. In the third connected condition, the third node is disconnected from the first node and the second node by opening the first switch and opening the second switch. Further, the switching unit switches between the first connected condition and the second connected condition via the third connected condition.

(3) The power unit for the electric vehicle may be configured as follows: the DC-DC converter maintains a switching operation before and after a switching operation is made between the second connected condition and the third connected condition.

(4) The power unit for the electric vehicle may be configured as follows: the power unit further comprising an auxiliary machine connected between the third node and the fourth node.

(5) The power unit for the electric vehicle may be configured as follows: a low voltage side terminal of the DC-DC converter is connected to the second node. In addition, a high voltage side terminal of the DC-DC converter is connected to the first node. Further, a common terminal is connected to the fourth node.

(6) The power unit for the electric vehicle may be configured as follows: a low voltage side terminal of the DC-DC converter is connected to the second node. In addition, a high voltage side terminal of the DC-DC converter is connected to the fourth node. Further, a common terminal is connected to the first node.

According to a power unit for an electric vehicle based on (1) above, when a load of an electric motor is small, and when a drive voltage necessary for the electric motor is small, a first power source and a second power source are connected in parallel with respect to the electric motor by opening the first switch and closing the second switch.

Meanwhile, when the load of the electric motor is large, and when the drive voltage necessary for the electric motor is large, the first power source and the second power source are connected in series with respect to the electric motor by closing the first switch and opening the second switch.

In these ways, when the load of the electric motor is large, a desired engine performance may be obtained by increasing the drive voltage of the electric motor. When the load of the electric motor is small, the drive voltage of the electric motor is prevented from becoming exceedingly large. Therefore, it is possible to enhance the driving efficiency of the inverter which drives and controls the electric motor. It is also possible to enhance the driving efficiency of the electric motor.

Therefore, even when the vehicle is traveling in a high-torque cruising mode, during a starting of the vehicle on a hill, for example, it is possible to prevent an increase in the switching loss of the inverter driving and controlling the electric motor. It is also possible to prevent overheating. Thus, it is possible to prevent an output restriction against the cruising control from occurring.

According to a power unit for an electric vehicle based on (2) above, when a connection between a first power source and a second power source with respect to an electric motor is switched over between a connection in parallel and a connection in series according to an increase in a load of the electric motor, a first switch and a second switch are opened, and the second power source is cut off from the electric motor. In addition, the third node, the first node, and the second node are cut off. A third connection condition is passed through. The third connection condition supplies electric power to the electric motor only by the first power source.

As a result, it is possible to switch the connection between the first power source and the second power source with respect to the electric motor between a connection in parallel and a connection in series according to the magnitude of the load of the electric motor in a condition in which the electric power supply with respect to the electric motor is maintained. For example, even during an AER (All Electric Range) travel, when the vehicle is run only with electric power supplied by the battery without using power from an internal combustion, the cruise control may be maintained at least by the electric power supplied by the first power source.

According to a power unit for an electric vehicle based on (3) above, the first power source and the second power source are connected in series in the second connection condition. In this second connection condition, the DC-DC converter performs a switching operation. As a result, it is possible to adjust a power output ratio between the first battery source and the second battery source.

According to a power unit for an electric vehicle based on (4) above, a consumed power of an auxiliary machine may be supplied from the second power source. As a result, when a connection between the first power source and the second power source with respect to the electric motor is switched between the connection in parallel and the connection in series, a greater amount of electric power may be supplied to the electric motor from the first power source providing the consumed power of the electric motor.

According to a power unit for an electric vehicle based on (5) above, for instance, a switching element of a high side arm of a chopper type DC-DC converter is connected to a first node, a switching element of a low side arm is connected to a fourth node, and a choke coil is connected to a second node.

According to a power unit for an electric vehicle based on (6) above, for instance, a switching element of a high side arm of a chopper type DC-DC converter is connected to a fourth node, a switching element of a low side arm is connected to a first node, and a choke coil is connected to a second node.

EMBODIMENT FOR CARRYING OUT THE INVENTION

Hereunder, a power unit for an electric vehicle according to an embodiment of the present invention is described with reference to the attached diagrams.

Figure 1:
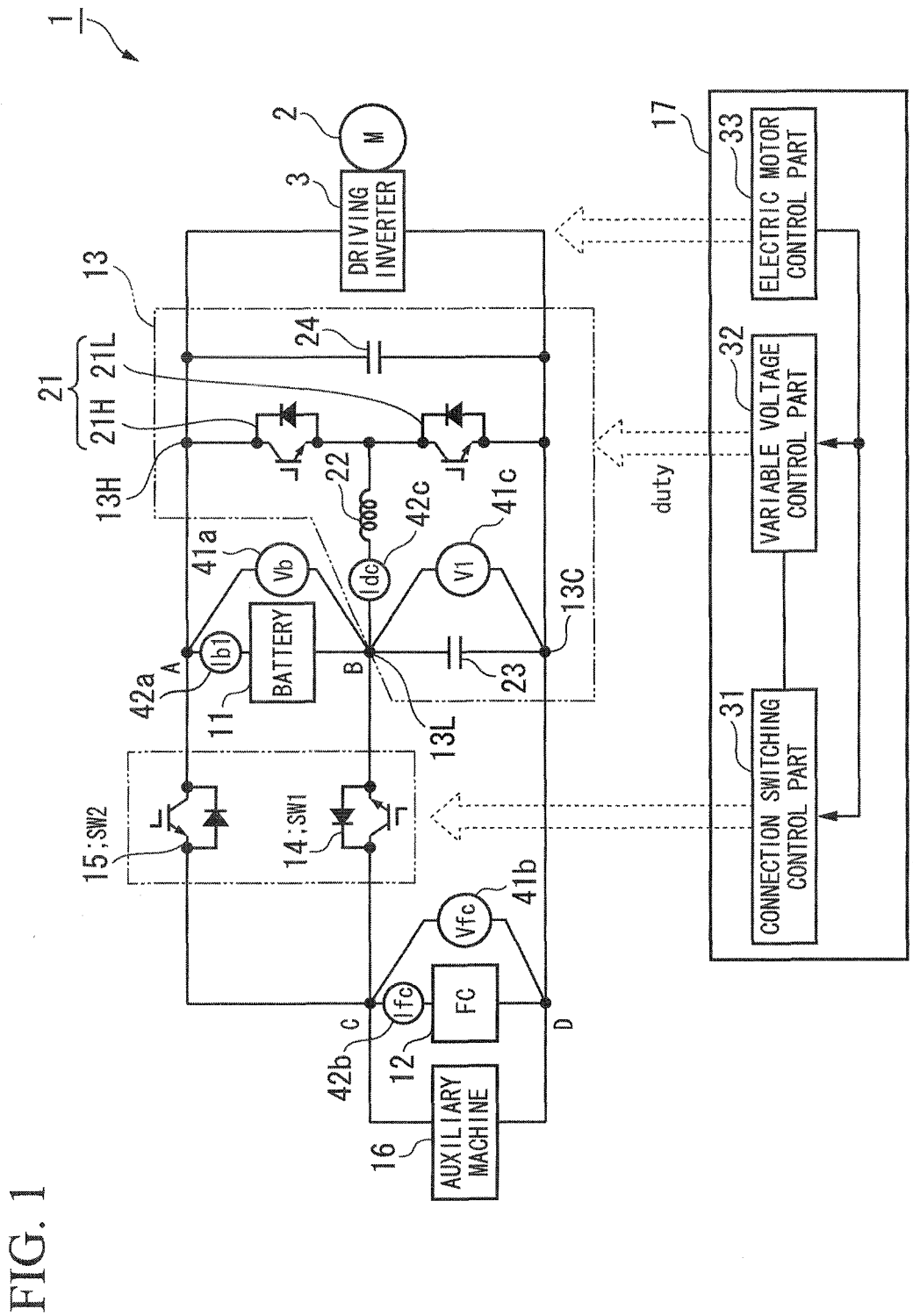
FIG. 1 is a configuration diagram of a power unit of an electric vehicle according to an embodiment of the present invention.

As shown in FIG. 1, for example, the power unit 1 for the electric vehicle according to the above embodiment comprises a power source supplying electric power to a driving inverter 3 for driving and controlling a electric motor (M) 2 generating a cruise driving force of the electric vehicle.

The power unit 1 for the electric vehicle comprises a first node A, a second node B, a third node C, a fourth node D, a battery 11, a fuel cell stack (FC) 12, DC-DC converter 13, a first switch (SW1) 14, a second switch (SW2) 15, an auxiliary machine 16, and a control device 17.

The driving inverter 3 is connected to the first node A and the fourth node D in parallel.

The battery 11 is connected between the first node A and the second node B.

The fuel cell stack (FC) 12 is connected between the third node C and the fourth node D.

The fuel cell stack 12 is configured so that a plurality of fuel cells are stacked. Each fuel cell is configured so that an electrolytic electrode structure is sandwiched between a pair of separators. The electrolytic electrode structure is configured so that a solid polymer electrolyte membrane is sandwiched between a fuel pole (anode) and an oxygen pole (cathode). The solid polymer electrolyte membrane includes a cation exchange membrane. The anode includes an anode catalyst and a gas diffusion layer. The cathode includes a cathode catalyst and a gas diffusion layer. A laminated body of the fuel cell is sandwiched by a pair of end plates from both sides of the direction of lamination.

Air is supplied to the cathode of the fuel cell stack 12 from an air pump (not diagramed). This air is an oxidant gas (reactive gas) including oxygen. A fuel gas (reactive gas) including hydrogen is supplied to the anode from a high-pressure hydrogen tank (not diagramed), for example.

Hydrogen is ionized by a catalytic reaction on the anode catalyst of the anode. This ionized hydrogen moves to the cathode via the solid polymer electrolyte membrane which is moisturized as appropriate. Electrode generated during this movement is extracted to an external circuit. This extracted electrode is used as an electronic energy for a connection in series. At this time, at the cathode, water is generated by the reaction among the hydrogen ion, electron, and oxygen.

Incidentally, the air pump takes in air from outside the vehicle and compresses the air. The air pump supplies this compressed air to the cathode of the fuel cell stack 12 as reactive gas.

The number of rotations of a pump driving motor (not diagramed) driving this air pump is controlled by an air pump inverter (not diagramed) according to a control command outputted by the control device 17. The air pump inverter includes, for example, a PWM inverter based on a pulse width modification (PWM), for example.

Electric power is supplied to this air pump inverter from the battery 11 and the like.

The DC-DC converter 13 is connected to the second node B. More specifically, the low voltage side terminal 13L is connected to the second node B. A high voltage side terminal 13H is connected to the first node 1A. A common terminal 13C is connected to a fourth node D.

The DC-DC converter 13 is, for example, a chopper type DC-DC converter. The DC-DC converter 13 comprises a switching circuit 21, a choke coil 22, and a first and second smoothing condenser 23, 24. The switching circuit 21 comprises a plurality of switching elements (for example, an IGBT: Insulated Gate Bipolar Mode Transistor) being connected.

The switching circuit 21 comprises, for example, a pair of high side switching element 21H and a low side switching element 21L being connected.

Further, a collector of the high side switching element 21H is connected to the high voltage side terminal 13H. An emitter of the low side switching element 21L is connected to the common terminal 13C. An emitter of the high side switching element 21H is connected to a collector of the low side switching element 21L.

In addition, a diode is connected between the emitter-collector of each high side switching element 21H and low side switching element 21L so that a forward direction is created from the emitter to the collector.

The switching circuit 21 is driven by a signal (PWM signal) that has undergone a pulse width modulation (PWM). The signal is outputted from the control device 17 and is inputted to a gate of each switching element 21H, 21L. In this way, a switching is made so as to alternate between a condition in which the high side switching element 21H is turned on and the low side switching element 21L is turned off, and a condition in which the high side switching element 21H is turned off and the low side switching element 21L is turned on.

For example, the on/off condition of the high side switching element 21H and the low side switching element 21L are switched according to a switching duty. An example of a switching duty (referred to as "duty") is defined by the duration of time (THon) for which the high side switching element 21H is turned on in one period of the PWM signal and by the duration of time (TLon) for which the low side switching element 21L is turned on in one period of the PWM signal. Thus, in this example, the equation duty=THon/(THon+TLon) and the like holds.

Incidentally, an appropriate "dead time" is set when the on/off condition is switched. During the "dead time," the high side switching element 21H and the low side switching element 21L are prohibited from being turned on at the same time. Instead, both the high side switching element 21H and the low side switching element 21L are turned off.

According to the present embodiment, as described later, a switching operation of the DC-DC converter 13 is maintained (i.e., the switching duty is not equal to zero), for example, during a condition in which the battery 11 and the fuel cell stack 12 are connected in parallel or in series with respect to the driving inverter 3 of the electric motor (M) 2. The switching operation of the DC-DC converter 13 is also maintained (i.e., the switching duty is not equal to zero) during a switching operation between a connection in parallel and a connection in series.

The choke coil 22 is configured so that one end is connected between an emitter-collector of the high side switching element 21H and the low side switching element 21L of the switching circuit 21, while another end is connected to the low voltage side terminal 13L.

The first smoothing condenser 23 is connected between the low voltage side terminal 13L and the common terminal 13C. The second smoothing condenser 24 is connected between the high voltage side terminal 13H and the common terminal 13C.

When the DC-DC converter 13 undergoes a pressure rising operation from a low voltage side to a high voltage side, first, the high side switching element 21H is turned off, and the low side switching element 21L is turned on. A direct current energization of the choke coil 22 is performed by an electric current inputted from the low voltage side terminal 13L. As a result, magnetic energy is stored.

Next, an induced voltage is generated is generated between both ends of the choke coil 22 so as to prevent a change in magnetic flux due to an interruption in electric current running through the choke coil 22 since the high side switching element 21H is turned on and the low side switching element 21L is turned off.

Accordingly, the induced voltage due to the magnetic energy accumulated in the choke coil 22 is loaded on the input voltage at the low voltage side. In this way, a boosted voltage, higher than the input voltage at the lower voltage side, is applied to the high voltage side.

The fluctuation in voltage occurring due to this switching operation is smoothed by the first and second smoothing condensers 23, 24. The boosted voltage is outputted from the high voltage side terminal 13H.

Incidentally, during a depressor operation from a high voltage side to a low voltage side, first, the high side switching element 21H is turned off, and the low side switching element 21L is turned on. A direct current energization of the choke coil 22 is performed by an electric current inputted from the high voltage side. As a result, magnetic energy is stored.

Next, an induced voltage is generated is generated between both ends of the choke coil 22 so as to prevent a change in magnetic flux due to an interruption in electric current running through the choke coil 22 since the high side switching element 21H is turned on and the low side switching element 21L is turned off.

The induced voltage due to the magnetic energy accumulated in the choke coil 22 becomes a depressor voltage since the input voltage at the high voltage side is lowered according to the switching duty. In this way, the depressor voltage is applied to the low voltage side.

The first switch (SW1) 14 is connected between the second node B and the third node C.

The second switch (SW2) 15 is connected between the first node A and the third node C.

The first switch 14 and the second switch 15 are, for example, a switching element (IGBT: Insulated Gate Bipolar Mode Transistor). An on-off control is performed according to the signal outputted from the control device 17.

Incidentally, for example, the first switch (SW1) 14, which is a switching element, is configured so that an emitter is connected to the second node B, a collector is connected to the third node C. Further, a diode is connected between the emitter and the collector so that a direction from the emitter to the collector becomes the forward direction.

Further, for example, the second switch (SW2) 15, which is a switching element, is configured so that a collector is connected to the first node A, an emitter is connected to the third node C. In addition, a diode is connected between the emitter and the collector so that a direction from the emitter to the collector becomes the forward direction.

The auxiliary machine 16 is connected between the third node C and the fourth node D. Electric power is supplied from the fuel cell stack (FC) 12.

The control device 17 includes, for example, a connection switching control part 31, a variable voltage control part 32, and an electric motor control part 33.

Signals are imputed to the control device 17. Examples of the signals include the following: a signal outputted by the voltage sensor 41a detecting a voltage (battery voltage) Vb of the battery 11 and by the electric current sensor 42a detecting an electric current (battery current) Ib; a signal outputted by the voltage sensor 41b detecting a voltage (fuel cell voltage) Vfc of the fuel cell stack (FC) 12 and by the electric current sensor 42b detecting an electric current (fuel cell current) Ifc; a signal outputted by the voltage sensor 41c detecting an electric voltage V1 (first DC-DC converter voltage) of the first smoothing condenser 23 of the DC-DC converter 13, i.e., an electric voltage V1 between the low voltage side terminal 13L and the common terminal 13C and by the electric current sensor 42c detecting an input current Idc of the DC-DC converter 13 (DC-DC converter input current); and a signal outputted by each sensor (not diagramed) detecting the number of rotations of the electric motor (M) 2 and the generated torque.

The connection switching control part 31 controls the on-off operations of the first switch (SW1) 14 and the second switch (SW2) 15.

The variable voltage control part 32 controls the switching operation of the DC-DC converter 13 according to the switching duty (duty) of the signal (PWM signal) that has undergone a pulse width modification (PWM). In other words, the variable voltage control part 32 controls the on-off operations of each switching element 21H and 21L.

Incidentally, a switching duty (duty) refers to, for example, a ratio of an on-period of each switching element 21H, 21L during one period of a PWM signal.

Further, due to the switching operation of the DC-DC converter 13, the variable voltage control part 32 adjusts the electric potential of the first node A from the second node B via the battery 11 by changing the electric potential of the second node B by, for example, making the first node A connectable to the third node C. Alternatively, the variable voltage control part 32 changes the electric potential of the second node B by, for example, making the second node B connectable to the third node C.

When an electric motor (M) 2 such as a three-phase brushless DC motor is driven, for example, the electric motor control part 33 performs a feedback control (vector control) of the electric current on a dq coordinate forming a rotational orthogonal coordinate. In this way, the electric motor control part 33 controls the electric power conversion operation of the driving inverter 3 converting a direct current (DC) electric power supplied by the battery 11 and the fuel cell stack 12 to an alternating-current (AC) electric power.

For example, the electric motor control part 33 computes a target d-axis electric current and a target q-axis electric current according to a torque command against the electric motor (M) 2. The electric motor control part 33 then computes each phase output voltage Vu, Vv, Vw of three phases based on the target d-axis electric current and the target q-axis electric current. According to each phase output voltage Vu, Vv, Vw, the electric motor control part 33 input a PWM signal to the driving inverter 3. This PWM signal is a gate signal.

Further, the electric motor control part 33 performs a feedback control so that each deviation between the following electric currents becomes zero: the d-axis electric current and the q-axis electric current obtained by converting to a dq coordinate, the detected values of each phase electric current Iu, Iv, Iw actually supplied to the electric motor (M) 2 from the driving inverter 3; and the target d-axis electric current and the target q-axis electric current.

The power unit 1 for the electric vehicle according to the above embodiment is, for example, configured as described above. Next, an operation of the power unit 1 for the electric vehicle is described.

Figure 2A:
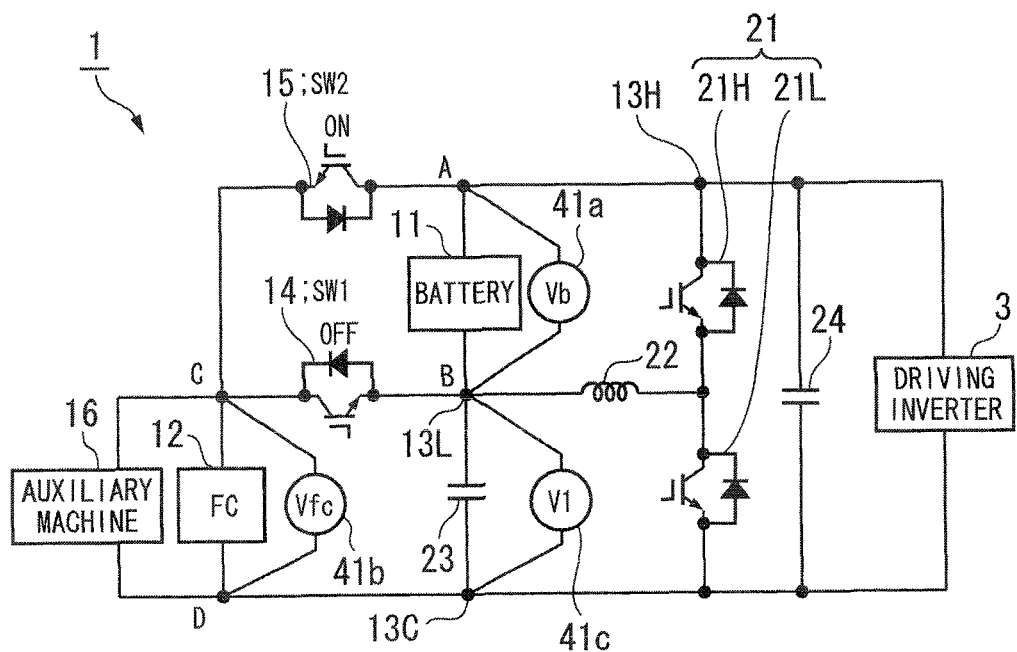
FIG. 2A is a diagram showing a condition in which a battery and a fuel cell stack (FC) are connected in parallel with respect to an inverter for driving an electric motor (M) of a power unit of an electric vehicle according to the above embodiment.

As shown in FIG. 2A, when the load of the electric motor (M) 2 is small and the driving voltage necessary for the electric motor (M) 2 is small, the control device 17 opens the first switch (SW1) 14 (i.e., turns off the first switch) and closes the second switch (SW2) 15 (i.e., turns on the second switch). In this way, the battery 11 and the fuel cell stack (FC) 12 are connected in parallel with respect to the driving inverter 3 of the power generator (M) 2.

Figure 3:
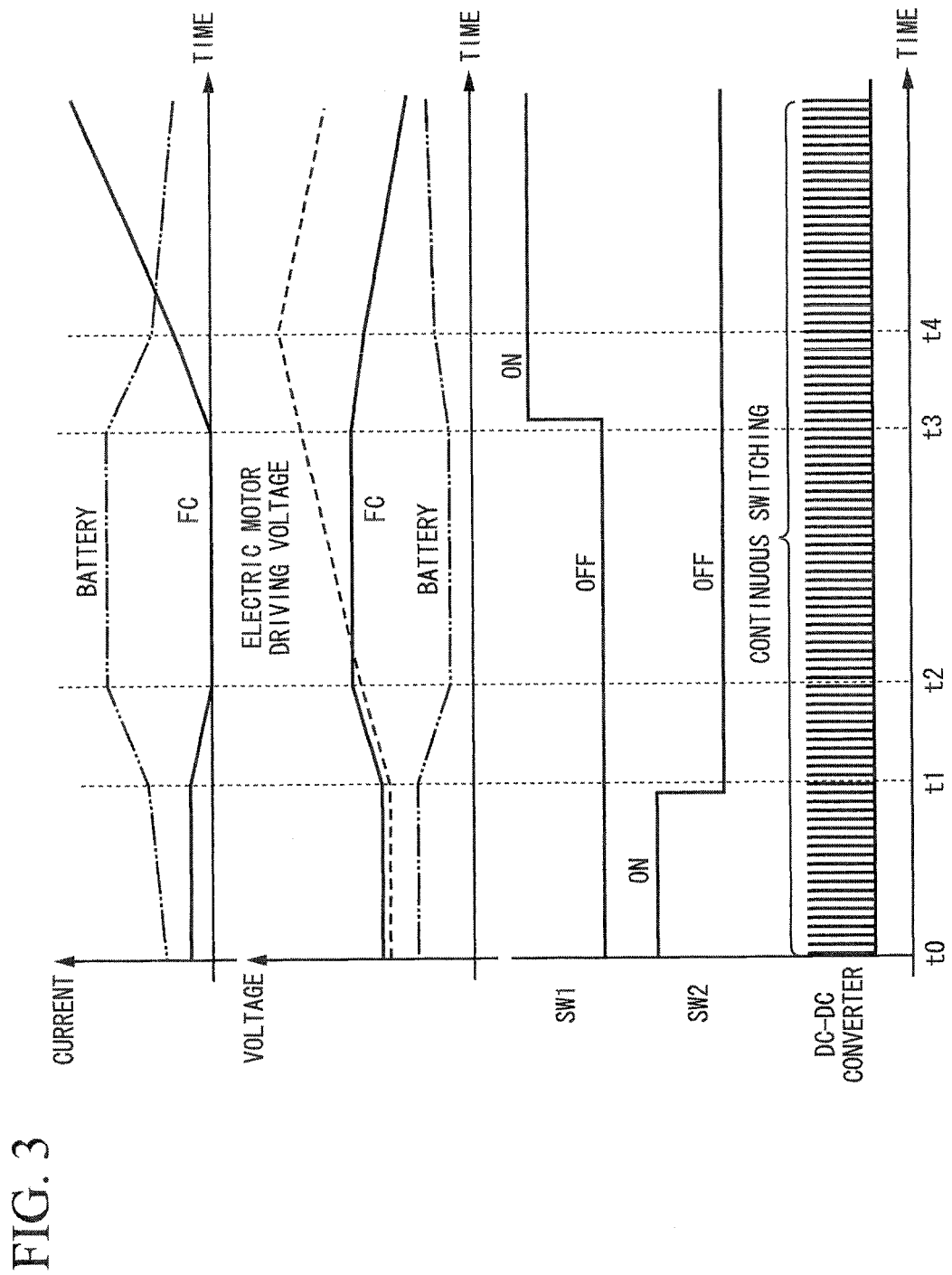
FIG. 3 is a diagram showing an example of a change in a battery current, a fuel cell current, and an electric motor driving voltage corresponding to an operation a DC-DC converter and a connection condition between a battery and a fuel cell stack (FC) with respect to an inverter for driving an electric motor (M) of a power unit of an electric vehicle according to the above embodiment.

When this connection in parallel is made, a switching operation of the DC-DC converter 13 is continued, for example, during a time interval from time t0 to time t1 as shown in FIG. 3.

Figure 2B:
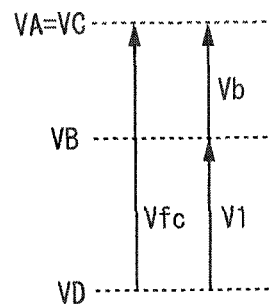
FIG. 2B is a diagram showing a condition in which a battery and a fuel cell stack (FC) are connected in parallel with respect to an inverter for driving an electric motor (M) of a power unit of an electric vehicle according to the above embodiment.

Accordingly, as shown in FIG. 2B, for example, the electric potential VA of the first node A becomes equal to the electric potential VC of the third node C. At the same time, the electric potential VA of the first node A and the electric potential VC of the third node C becomes higher than the electric potential VD of the fourth node D by a sum of the first DC-DC converter voltage V1 and the battery voltage Vb (V1+Vb). Further, the electric potential VB of the second node B becomes higher than the electric potential VD of the fourth node D by an amount of the first DC-DC converter voltage V1.

When this connection in parallel is made (i.e., a first connected condition), the switching duty of the DC-DC converter 13 is represented by the following equation (1), for example.

(Equation 1)

$$\frac{V1}{Vfc} = 1 - \text{duty} \qquad (1)$$

When this connection in parallel is made, the electric motor driving voltage supplied to the driving inverter 3 of the electric motor (M) 2 is equal to the fuel cell voltage Vfc, from time t0 to time t1 shown in FIG. 3, for example. Thus, the fuel cell stack 12 is set as a main power source. The battery 11 is set as an assist power source.

The output ratio of the fuel cell stack 12 and the battery 11 is controlled by the first DC-DC converter voltage V1 according to the switching duty of the DC-DC converter 13, as shown in the following equation (2), for example.

(Equation 2)

$$V1 = (1-\text{duty}) \cdot Vfc \qquad (2)$$

When this connection in parallel is made, and when there is an increase in the driving voltage necessary for the electric motor (M) 2 due to an increase in the load of the electric motor (M) 2, for example, the control device 17 switches the connection of the battery 11 and the fuel cell stack 12 with respect to the driving inverter 3 of the electric motor (M) 2 to a connection in series.

Figure 4A:
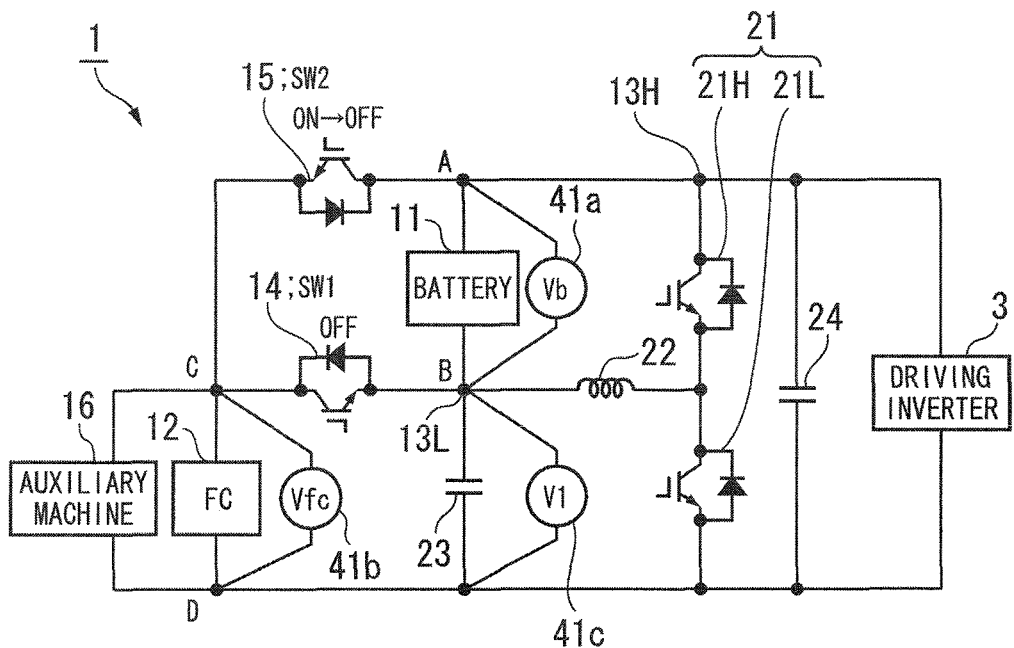
FIG. 4A is a diagram showing a condition of switching a connection between a battery and a fuel cell stack (FC) from a connection in parallel to a connection in series with respect to an inverter for driving an electric motor (M) of a power unit of an electric vehicle according to the above embodiment.

When this switching of the connection is made, the control device 17 first maintains the first switch (SW1) 14 in an opened state (i.e., turned off), and switches the second switch (SW2) 15 from a closed condition (i.e., turned on) to an opened state (i.e., turned off), as shown in FIG. 4A, for instance.

As a result, the third node C is cut off from the first node A and the second node B.

Then, a switching operation is performed by decreasing the switching duty of the DC-DC converter 13 as shown in the following equation (3).

(Equation 3)

$$\frac{V1}{(V1+Vb)} = 1 - \text{duty} \qquad (3)$$

Figure 4B:
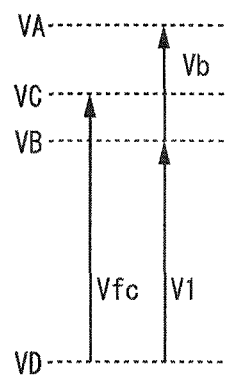
FIG. 4B is a diagram showing a condition of switching a connection between a battery and a fuel cell stack (FC) from a connection in parallel to a connection in series with respect to an inverter for driving an electric motor (M) of a power unit of an electric vehicle according to the above embodiment.

Accordingly, as shown in FIG. 4B and the following equation (4), for example, the first DC-DC converter voltage V1 increases. The electric potential VB of the second node B increases toward the electric potential VC of the third node C. The electric potential VA of the first node A becomes larger than the electric potential VC of the third node C by an increment of the first DC-DC converter voltage V1.

(Equation 4)

$$V1 = \left(\frac{1}{\text{duty}} - 1\right) \cdot Vb \qquad (4)$$

During this condition in which a switching of the connection is made (i.e., a third connected condition), the electric motor driving voltage supplied to the driving inverter 3 of the electric motor (M) 2 increases according to an increase in the first DC-DC converter voltage V1, from time t1 to time t3 shown in FIG. 3, for example.

Once the battery current Ib increases to a predetermined high side electric current value, the value of the battery current Ib is maintained at this high side electric current value.

Once the fuel cell current Ifc decreases to a predetermined low side electric current value, the value of the fuel cell current Ifc is maintained at this low side electric current value.

Figure 5A:
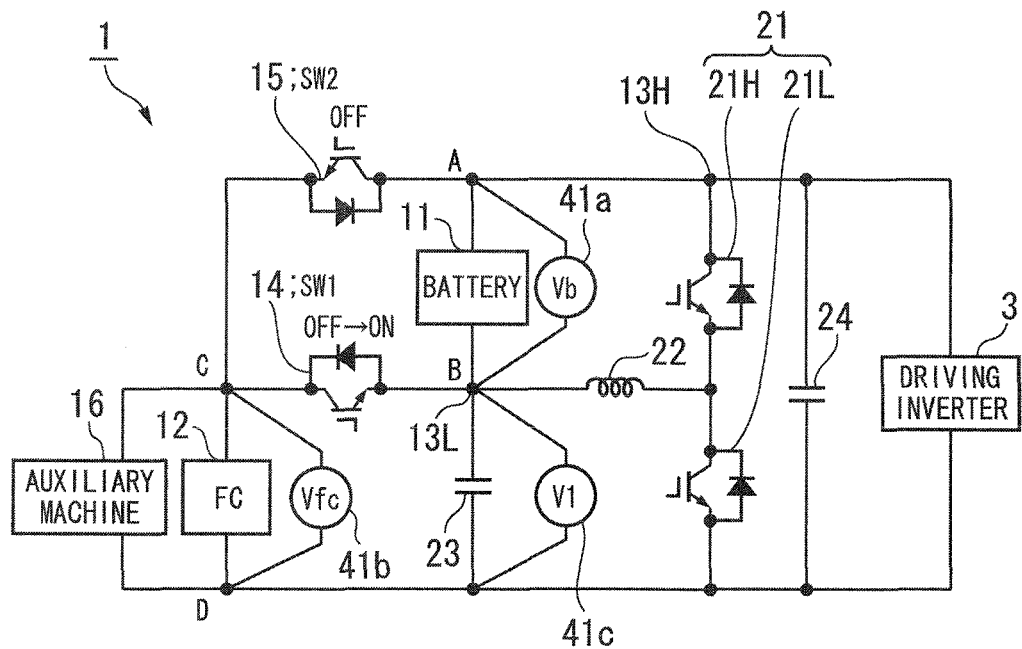
FIG. 5A is a diagram showing a condition of switching a connection between a battery and a fuel cell stack (FC) from a connection in parallel to a connection in series with respect to an inverter for driving an electric motor (M) of a power unit of an electric vehicle according to the above embodiment.

Next, when the first DC-DC converter voltage V1 reaches the fuel cell voltage Vfc, i.e., when the second node B may be connected to the third node C, the control device 17 maintains the switching operation of the DC-DC converter 13 as shown in FIG. 5A, for example. In addition, the control device 17 switches the first switch (SW1) 14 from an opened state (i.e., a state in which the first switch is turned off) to a closed state (i.e., a state in which the first switch is turned on). At the same time, the second switch (SW2) 15 is maintained to be an opened state (i.e., turned off). Further, the battery 11 and the fuel cell stack (FC) 12 are connected in series with respect to the driving inverter 3 of the electric motor (M) 2.

Figure 5B:
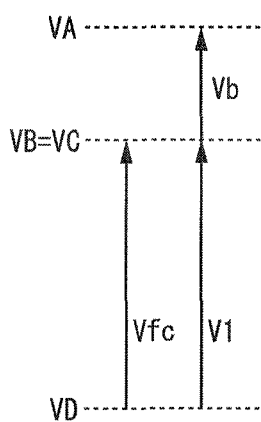
FIG. 5B is a diagram showing a condition of switching a connection between a battery and a fuel cell stack (FC) from a connection in parallel to a connection in series with respect to an inverter for driving an electric motor (M) of a power unit of an electric vehicle according to the above embodiment.
Figure 6:
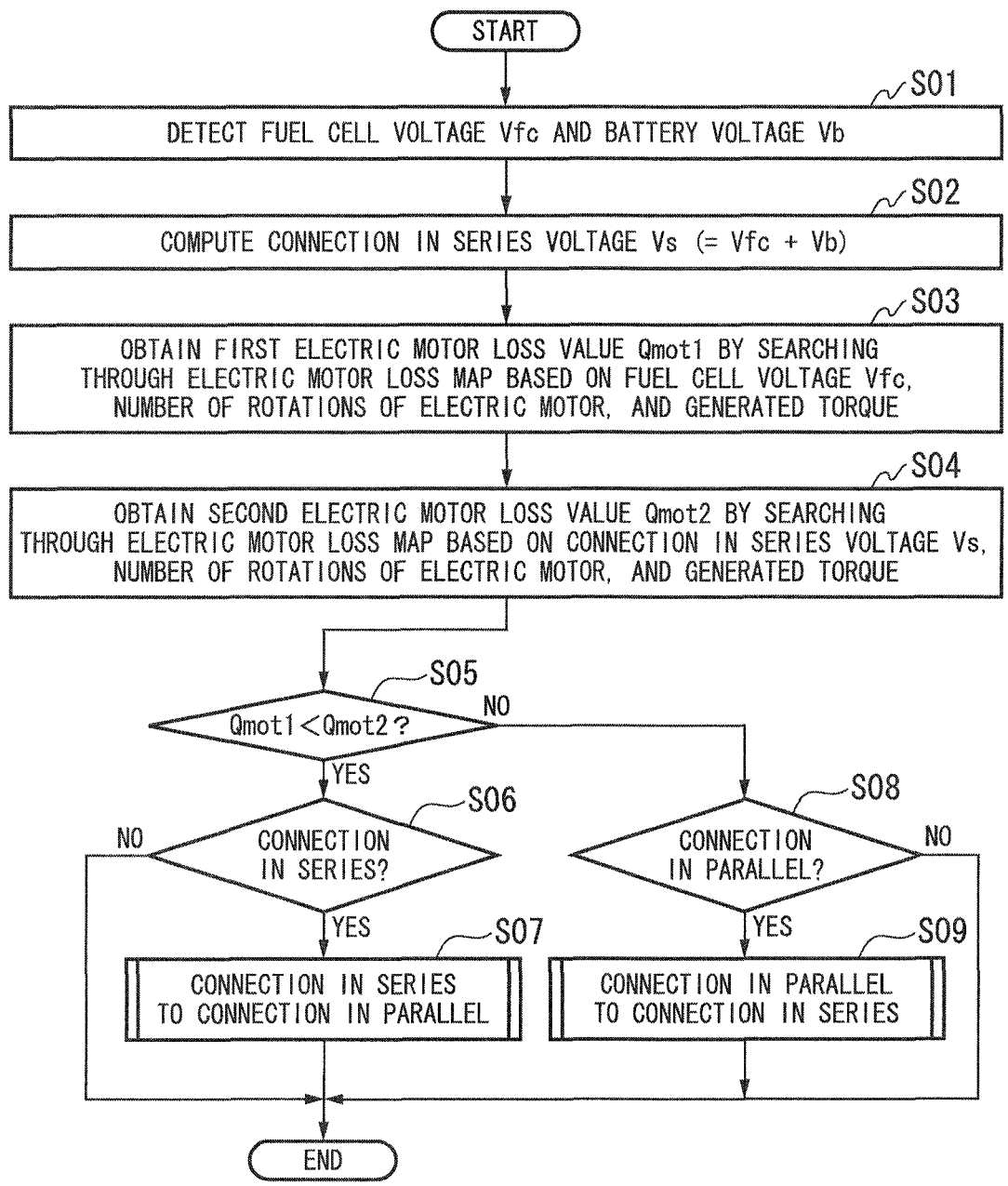
FIG. 6 is a flowchart showing an operation of a power unit of an electric vehicle according to the above embodiment.

As a result, as shown in FIG. 5B for example, the electric potential VB of the second node B becomes equal to the electric potential VC of the third node C. At the same time, the electric potential VB of the second node B and the electric potential VC of the third node C becomes greater than the electric potential VD of the fourth node D by an amount of the first DC-DC converter voltage V1. The first DC-DC converter V1 is the same as the fuel cell voltage Vfc. The electric potential VA of the first node A becomes higher than the electric potential VC of the third node C by an amount of the battery voltage Vb.

Further, the battery electric current Ib decreases from a predetermined high side electric current value, and the fuel cell electric current Ifc increases from a predetermined low side electric current value. These changes are shown, for example in FIG. 3 corresponding to the time period after time t3.

When this connection in series is made (i.e., a second connected condition), the control device 17 maintains the switching operation of the DC-DC converter 13. The switching duty is represented by equation (5), for example.

Therefore, as shown in equation (6), for example, the ratio between the fuel cell voltage Vfc of the fuel cell stack 12 and the battery voltage Vb of the battery 11 is represented by the switching duty. This ratio corresponds to the ratio between the operating point of the fuel cell stack 12 (for instance, an electronic voltage or an electronic current or an electronic power) and the operating point of the battery 11 (for instance, an electronic voltage or an electronic current or an electronic power).

(Equation 5)
$$\text{duty} = \frac{Vb}{(Vfc + Vb)} \quad (5)$$

(Equation 6)
$$\frac{Vb}{Vfc} = \frac{\text{duty}}{1 - \text{duty}} \quad (6)$$

Since the ratio between the operating point of the fuel cell stack 12 and the operating point of the battery 11 is represented by the switching duty, the control device 17 supplements the total consumed electric power of the load with the output power by the power supplying side such as the fuel cell stack 12 and the battery 11. In this way, the control device 17 controls the output ratio between the fuel cell stack 12 and the battery 11.

As a result, it is possible to execute various operating modes when the electric motor (M) 2 is driven and regenerated. The switching duty of the DC-DC converter 13 is controlled by setting a target electric current of the fuel cell electric current Ifc with respect to each operating mode, and by performing a feedback control so that the fuel cell electric current Ifc equals the target electric current.

Examples of a mode when the electric motor (M) 2 is driven include the following: an EV mode in which only the output of the battery 11 is supplied to the driving inverter 3, a (battery+FC) mode in which the output of the battery 11 and the fuel cell stack 12 are supplied to the driving inverter 3, a first FC mode in which only the output of the fuel cell stack 12 is supplied to the driving inverter 3, and a second FC mode in which only the output of the fuel cell stack 12 is supplied to the driving inverter 3 and the battery 11 and the battery 11 is charged.

Examples of a mode when the electric motor (M) 2 is regenerated include the following: a regenerating mode in which the battery 11 is charged by the regenerating electric power of the driving inverter 3, and a (regenerating+battery-charging-by-FC) mode in which the regenerating electric power of the driving inverter 3 and the output of the fuel cell stack 12 are supplied to the battery 11 and the battery 11 is charged.

For example, in the first FC mode in which only the output of the fuel cell stack 12 is supplied to the driving inverter 3, the control device 17 increases the output ratio of the battery 11 in the following instances: when there is a shortage of the output of the fuel cell stack 12 with respect to the output required by the electric motor (M) 2, or, when the operating efficiency of the fuel cell stack 12 decreases as a result of the output required by the electric motor (M) 2 being low, or, when the operating condition is such that the deterioration of the fuel cell stack 12 is prompted.

Hereinafter, a switching operation of switching the connection between the battery 11 and the fuel cell stack (FC) 12 with respect to the driving inverter 3 of the electric motor (M) 2 to a connection in parallel or to a connection in series is described.

Figure 9:
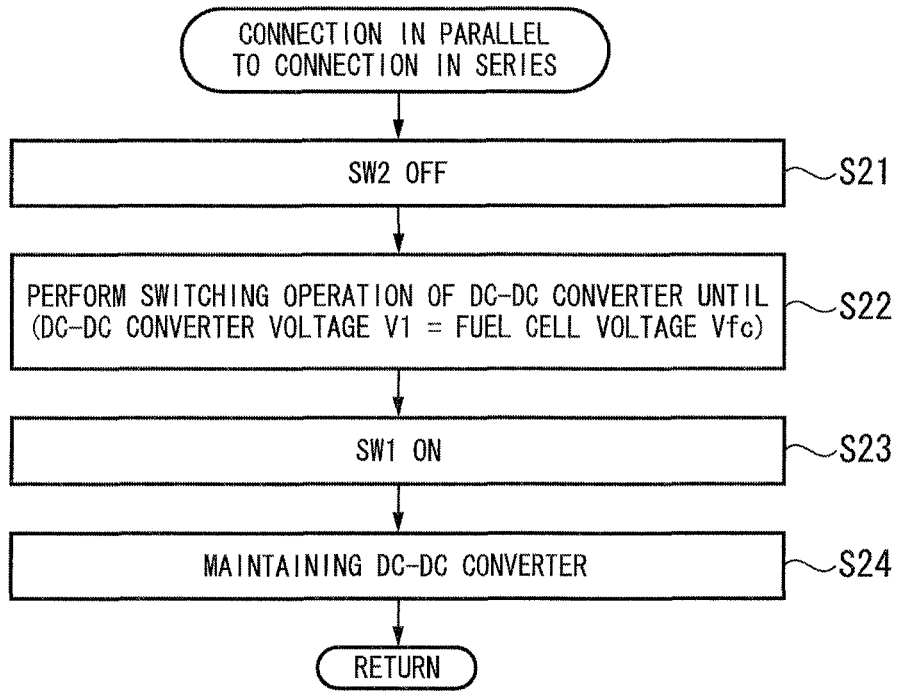
FIG. 9 is a flowchart showing a switching operation shown in FIG. 6 from a connection in parallel to a connection in series.

First, in step S01 shown in FIG. 9, for example, the battery voltage Vb and the fuel cell voltage Vfc are detected.

Next, in step S02, a connection in series voltage Vs (=Vfc+Vb) during a connection in series is computed.

Figure 7:
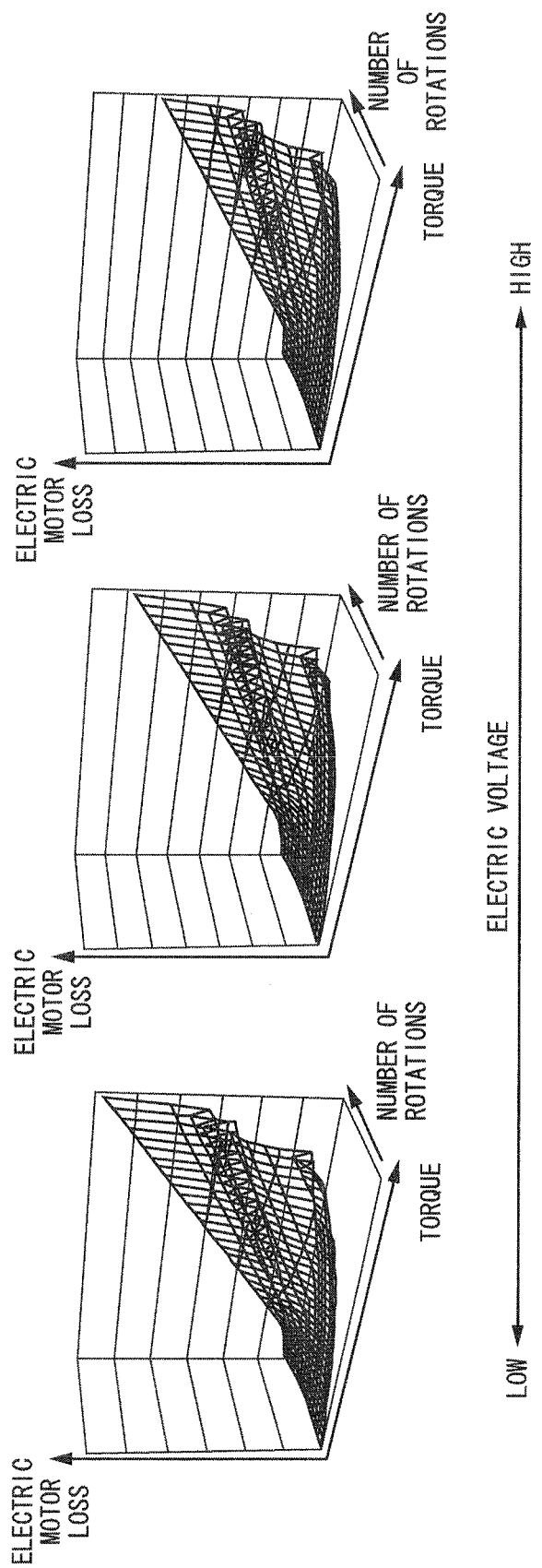
FIG. 7 is a diagram showing an example of an electric motor loss map according to the above embodiment.

Next, in step S03, a first electric motor loss value Qmot1 is obtained by searching through an electric motor loss map as shown in FIG. 7, for example, in accordance with the fuel cell voltage Vfc corresponding to a connection in parallel voltage Vp during a connection in parallel, the number of rotations of the electric motor (M) 2, and the generated torque.

Incidentally, the electric motor loss map is created according to the examination result of a test that is conducted in advance. For example, as a result of an increase in the number of rotations of the electric motor (M) 2 or an increase in the generated torque, the electric motor loss value increases. As a result of an increase in electric voltage, the electric motor loss value decreases.

Next, in step S04, a second electric motor loss value Qmot2 is obtained by searching through an electric motor loss map as shown in FIG. 7, for example, in accordance with the connection in series voltage Vs, the number of rotations of the electric motor (M) 2, and the generated torque.

Next, in step S05, it is determined whether the first electric motor loss value Qmot1 is less than the second electric motor loss value Qmot2.

When the result of step S05 is NO, the procedure moves on to step S08.

When the result of step S05 is YES, the procedure moves on to step S06.

Further, in step S06, it is determined whether the battery 11 and the fuel cell stack (FC) 12 are connected in series with respect to the driving inverter 3 of the electric motor (M) 2.

When the result of step S06 is NO, the procedure ends.

Meanwhile, when the result of step S06 is YES, the procedure moves on to step S07. In this step S07, a switching operation from a connection in series to a connection in parallel is performed, and the procedure ends. This switching operation is described below.

Further, in step S08, it is determined whether the battery 11 and the fuel cell stack (FC) 12 are connected in parallel with respect to the driving inverter 3 of the electric motor (M) 2.

When the result of step S08 is NO, the procedure ends.

Meanwhile, when the result of step S08 is YES, the procedure moves on to step S09. In this step S09, a switching operation from a connection in parallel to a connection in series is performed, and the procedure ends.

Next, a switching operation in step S07 from a connection in series to a connection in parallel is described.

Figure 8:
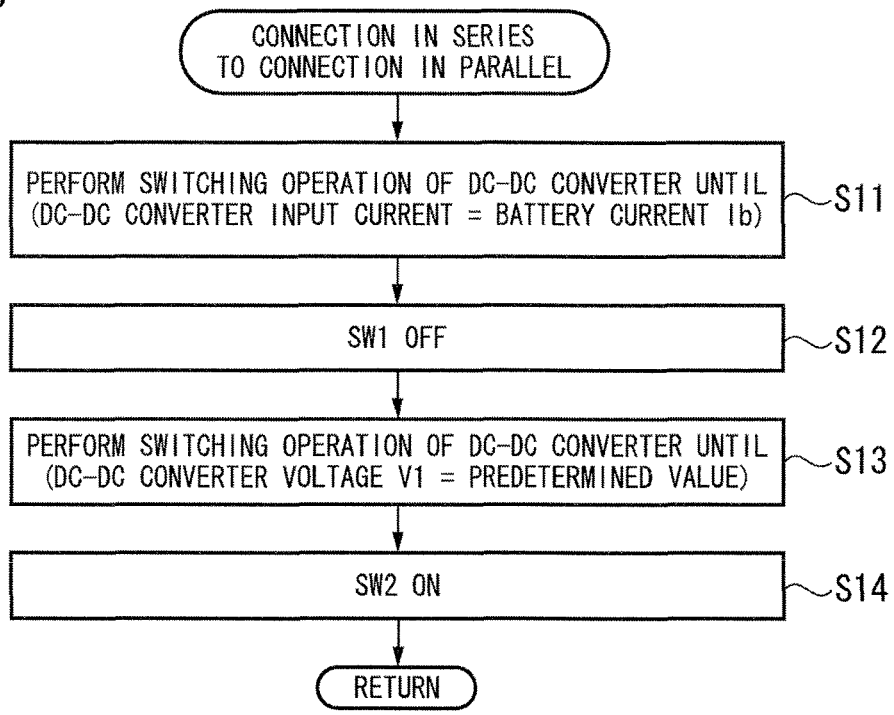
FIG. 8 is a flowchart showing a switching operation shown in FIG. 6 from a connection in series to a connection in parallel.

First, in step S11 shown in FIG. 8, for example, a switching operation of the DC-DC converter 13 is performed so that the DC-DC converter input electric current Idc becomes the same as the battery electric current Ib.

Next, in step S12, the first switch (SW1) 14 is switched from a closed state (i.e., turned on) to an opened state (i.e., turned off).

Next, in step S13, the electric potential of the second node B is altered so that the first node A is connectable to the third node C. In this way, the electric potential VA of the first node A from the second node B via the battery 11 is adjusted. A switching operation of the DC-DC converter 13 is performed so that the first DC-DC converter voltage V1 becomes a predetermined value (i.e., a predetermined value so that the first node A is connectable to the third node C).

Next, in step S14, the second switch (SW2) 15 is switched from an opened state (i.e., turned off) to a closed state (i.e., turned on). The procedure then returns.

Hereinafter, a switching operation from a connection in parallel to a connection in series is described. This switching operation is conducted in step S09 as described above.

First, in step S21 shown in FIG. 9, for example, the second switch (SW2) 15 is switched from a closed state (i.e., turned on) to an opened state (i.e., turned off).

Next, in step S22, the second node B is made connectable to the third node C. Further, the switching operation of the DC-DC converter 13 is performed so that the first DC-DC converter voltage V1 becomes equal to the fuel cell voltage Vfc.

Next, in step S23, the first switch (SW1) 14 is switched from an opened state (i.e., turned off) to a closed state (i.e., turned on).

Next, in step S24, the switching operation of the DC-DC converter 13 is maintained. The procedure then returns.

As described above, according to a power unit 1 for an electric vehicle based on the above embodiment described above, when the load of the electric motor (M) 2 is small, and the driving voltage necessary for the electric motor (M) 2 is small, the battery 11 and the fuel cell stack (FC) 12 are connected in parallel with respect to the driving inverter 3 of the electric motor (M) 2.

Meanwhile, when the load of the electric motor is large, and the driving voltage necessary for the electric motor is large, the battery 11 and the fuel cell stack (FC) 12 are connected in series with respect to the driving inverter 3 of the electric motor (M) 2.

In these ways, when the load of the electric motor (M) 2 is large, it is possible to obtain a predetermined engine performance by increasing the driving voltage of the electric motor (M) 2. When the load of the electric motor (M) 2 is small, it is possible to enhance the driving efficiency of the electric motor (M) 2 and the driving inverter 3 by preventing the driving voltage of the electric motor (M) 2 from being excessively large.

Therefore, even when the vehicle is traveling in a high-torque cruising mode, during a starting of the vehicle on a hill, for example, it is possible to prevent an increase in the switching loss of the inverter driving and controlling the electric motor. It is also possible to prevent overheating. Thus, it is possible to prevent an output restriction against the cruising control from occurring.

Furthermore, when a connection in parallel between the battery 11 and the fuel cell stack (FC) 12 with respect to the driving inverter 3 of the electric motor (M) 2 is switched between a connection in parallel and a connection in series according to an increase in the load of the electric motor (M) 2, first, the first switch (SW1) 14 and the second switch (SW2) 15 are opened. The fuel cell stack 12 is cut off from the electric motor (M) 2. The third node C is cut off from the first node A and the second node B. Thus, the third connected condition is passed through. In the third connected condition, electric power is supplied to the electric motor (M) 2 only by the battery 11.

As a result, it is possible to switch the connection of the battery 11 and the fuel cell stack (FC) 12 with respect to the electric motor (M) 2 between a connection in parallel and a connection in series according to the magnitude of the load of the electric motor (M) 2 in a condition in which the electric power supply to the electric motor (M) 2 is maintained. Therefore, for example, even during an AER (All Electric Range) travel, when the vehicle is run only with electric power supplied by the battery without using power from an internal combustion, the cruise control may be maintained at least by the electric power supplied by the battery 11.

In a second connected condition, in which the battery 11 and the fuel cell stack (FC) 12 are connected in series with respect to the driving inverter 3 of the electric motor (M) 2, it is possible to easily adjust the output ratio between the battery 11 and the fuel cell stack 12 by performing a switching operation of the DC-DC converter 13 and by altering the switching duty.

In a first connected condition, in which the battery 11 and the fuel cell stack (FC) 12 are connected in parallel with respect to the driving inverter 3 of the electric motor (M) 2, it is possible to easily adjust the output ratio between the battery 11 and the fuel cell stack 12 according to the first DC-DC converter voltage V1. Here, the main power source and the assisting power source are separated while only one end of the battery 11 (i.e., a terminal at the first node A side) and one end of the fuel cell stack 12 (i.e., a terminal at the third node C side) are connected at the same electric potential.

Electric power consumed by the auxiliary machine 16 may be supplied by the fuel cell stack (FC) 12. Thus, when the connection of the battery 11 and the fuel cell stack (FC) 12 with respect to the driving inverter 3 of the electric motor (M) 2 is switched between a connection in parallel and a connection in series, it is possible to supply more electric power to the electric motor (M) 2 from the battery 11 which provides the electric power consumed by the electric motor (M) 2.

Figure 10:
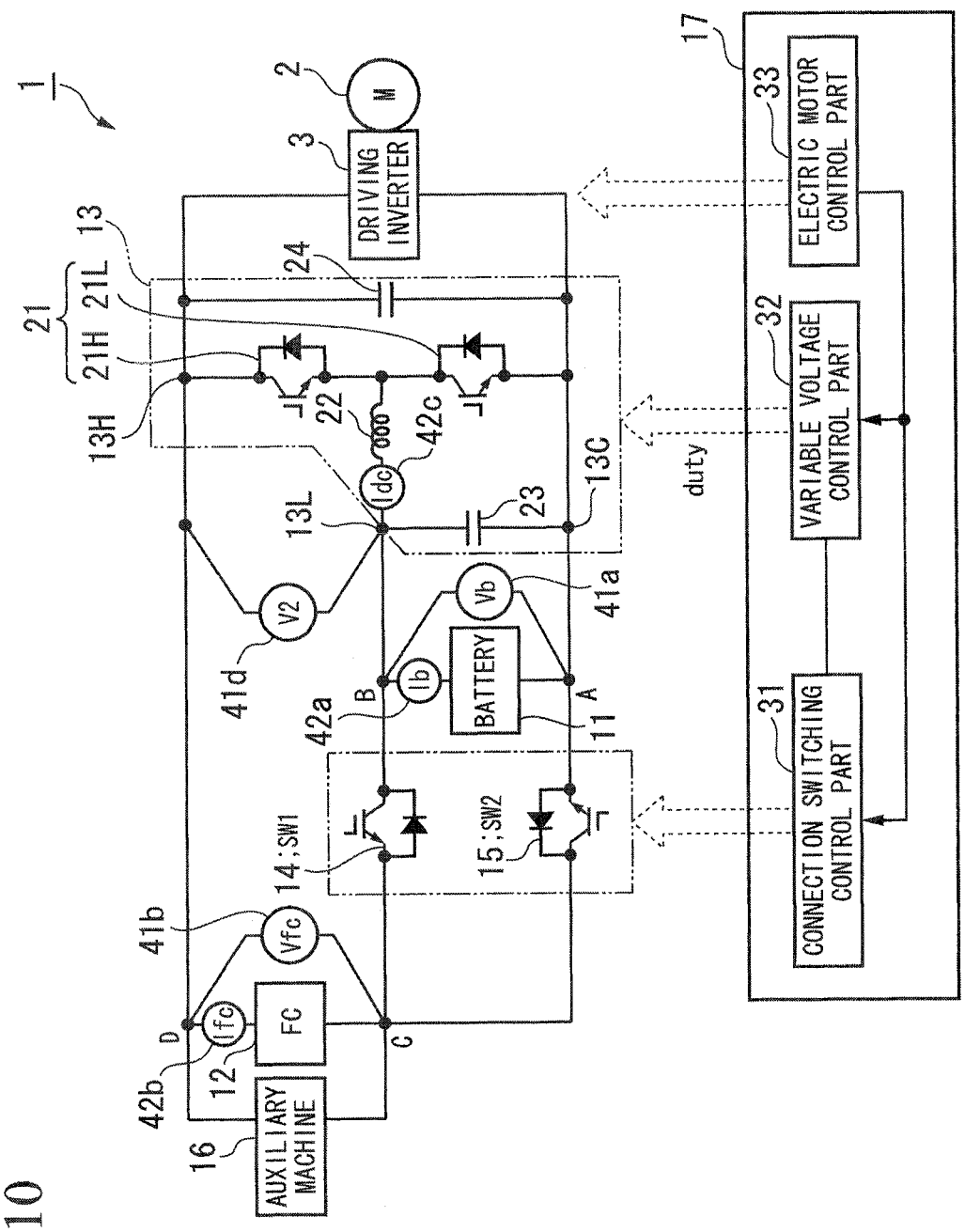
FIG. 10 is a configuration diagram of a power unit for an electric vehicle according to a variation of an embodiment of the present invention.

Incidentally, according to the above embodiment, the polarity of each component of the power unit 1 for the electric vehicle may be made opposite, as shown in the variation shown in FIG. 10, for example.

The configuration of the power unit 1 for the electric vehicle based on this variation is different from the configuration of the power unit 1 for the electric vehicle based on the above embodiment in that, according to the variation, the high voltage side terminal 13H of the DC-DC converter 13 is connected to the fourth node D, the common terminal 13C is connected to the first node A, and a voltage sensor 41d is provided instead of the voltage sensor 41c. The voltage sensor 41d detects the voltage V2 (the second DC-DC converter voltage) between the high voltage side terminal 13H and the low voltage side terminal 13L.

Hereinafter, an operation of the power unit 1 for the electric vehicle according to the variation of the above embodiment is described.

Figure 11A:
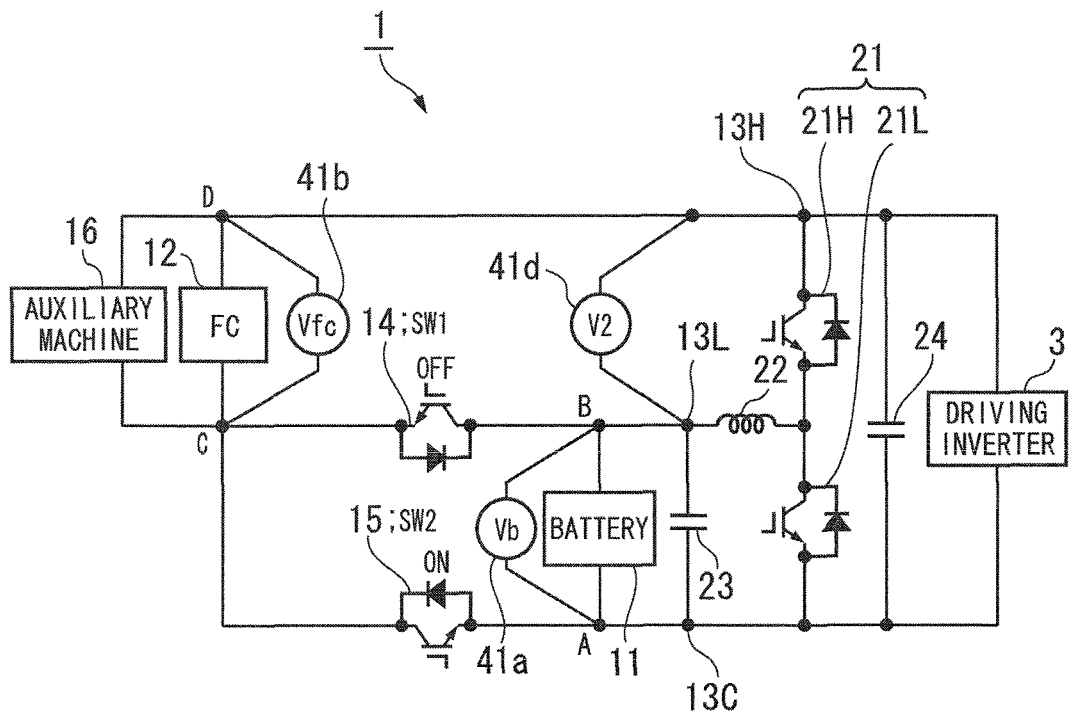
FIG. 11A is a diagram showing a condition of connecting a battery and a fuel cell stack (FC) in parallel with respect to an inverter for driving an electric motor (M) of a power unit of an electric vehicle according to a variation of an embodiment of the present invention.

As shown in FIG. 11A, for example, when the load of the electric motor (M) 2 is small and the driving voltage necessary for the electric motor (M) 2 is small, the control device 17 opens the first switch (SW1) 14 (i.e., turns off the first switch) and closes the second switch (SW2) 15 (i.e., turns on the second switch). In this way, the battery 11 and the fuel cell stack (FC) 12 are connected in parallel with respect to the driving inverter 3 of the power generator (M) 2.

When this connection in parallel is made, the switching duty of the DC-DC converter 13 is set to zero.

Figure 11B:
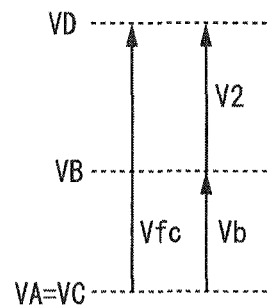
FIG. 11B is a diagram showing a condition of connecting a battery and a fuel cell stack (FC) in parallel with respect to an inverter for driving an electric motor (M) of a power unit of an electric vehicle according to a variation of an embodiment of the present invention.

As a result, as shown in FIG. 11B, for example, the electric potential VA of the first node A becomes equal to the electric potential VC of the third node C, the electric potential VB of the second node B becomes greater than the electric potential VA of the first node A and the electric potential VC of the third node C by an amount of the battery voltage Vb, and the electric potential VD of the fourth node D becomes larger than the electric potential VB of the second node B by an amount of the second DC-DC converter voltage V2.

When this connection in parallel is made (i.e. the first connected condition), the switching duty of the DC-DC converter 13 is represented by equation (7), for example.

(Equation 7)

$$\frac{Vb}{Vfc} = 1 - \text{duty} \quad (7)$$

When this connection in parallel is made, the electric motor driving voltage supplied to the driving inverter 3 of the electric motor (M) 2 is equal to the fuel cell voltage Vfc. Thus, the fuel cell stack 12 is set as the main power source. The battery 11 is set as the assisting power source.

The output ratio between the fuel cell stack 12 and the battery 11 is controlled, as shown in the following equation (8), by the second DC-DC converter voltage V2 according to the switching duty of the DC-DC converter 13.

(Equation 8)
$$V2 = \left(\frac{duty}{1-duty}\right) \cdot Vb \qquad (8)$$

When this connection in parallel is made, and when the driving voltage necessary for the electric motor (M) 2 increases due to an increase in the load of the electric motor (M) 2, for example, the control device 17 performs a switching operation to switch the connection of the battery 1 and the fuel cell stack (FC) 12 with respect to the driving inverter 3 of the electric motor (M) 2 to a connection in series.

Figure 12A:
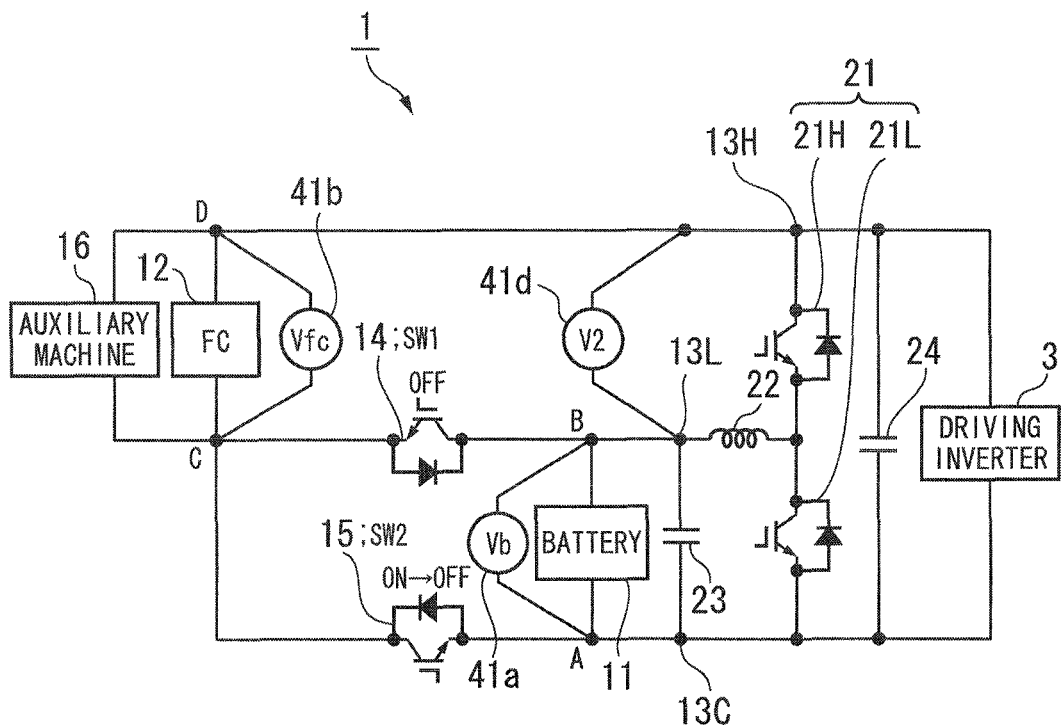
FIG. 12A is a diagram showing a condition of switching a connection between a battery and a fuel cell stack (FC) from a connection in parallel to a connection in series with respect to an inverter for driving an electric motor (M) of a power unit of an electric vehicle according to a variation of an embodiment of the present invention.

When this connection-switching operation is performed, the control device 17 first maintains the first switch (SW1) 14 in an opened state (i.e., the first switch is turned off), and switches the second switch (SW2) 15 from a closed state (i.e., the second switch is turned on) to an opened state (i.e., the second switch is turned off), as shown in FIG. 12A, for instance.

As a result, the third node C is cut off from the first node A and the second node B.

Then, a switching operation is performed by reducing the switching duty of the DC-DC converter 13 represented by equation (9) below.

(Equation 9)
$$\frac{Vb}{(Vb+V2)} = 1 - duty \qquad (9)$$

Figure 12B:
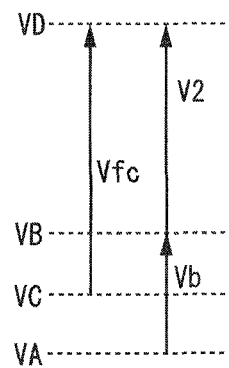
FIG. 12B is a diagram showing a condition of switching a connection between a battery and a fuel cell stack (FC) from a connection in parallel to a connection in series with respect to an inverter for driving an electric motor (M) of a power unit of an electric vehicle according to a variation of an embodiment of the present invention.

Accordingly, as shown in FIG. 12B and the following equation (10), for example, the second DC-DC converter voltage V2 increases. The electric potential VC of the third node C becomes higher than the electric potential VA of the first node A by an amount of the increment of the second DC-DC converter voltage V2. As a result, there is a decrease in the difference between the electric potential VC of the third node C and the electric potential VB of the second node B.

(Equation 10)
$$V2 = \left(\frac{1}{duty} - 1\right) \cdot Vb \qquad (10)$$

Figure 13A:
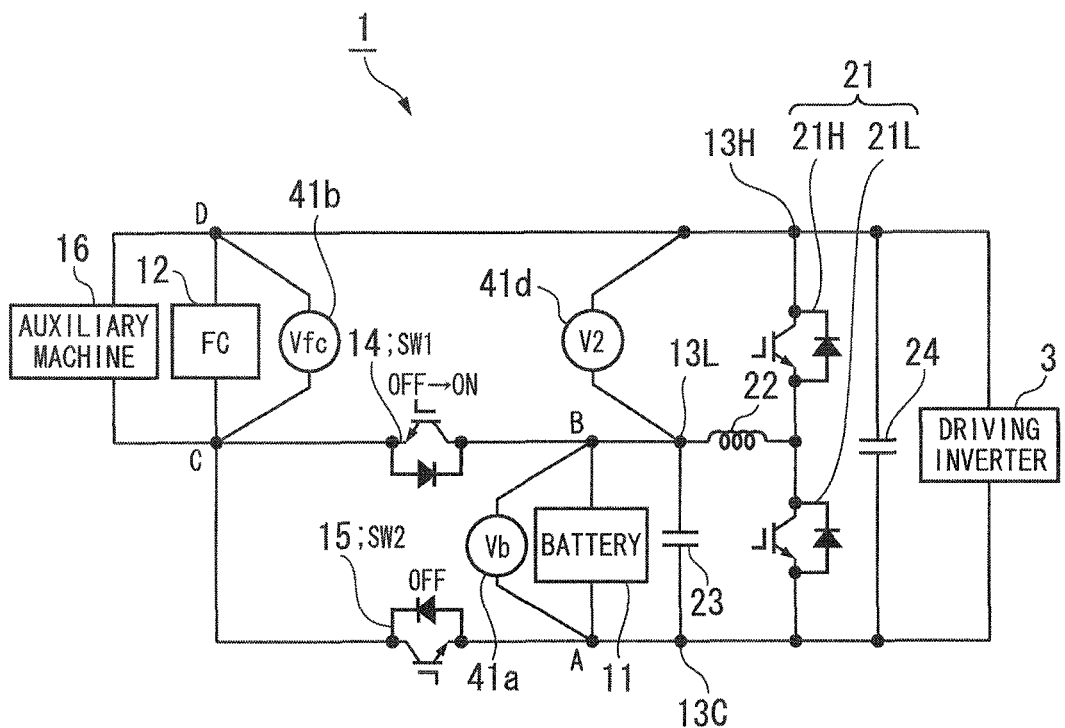
FIG. 13A is a diagram showing a condition of switching a connection between a battery and a fuel cell stack (FC) from a connection in parallel to a connection in series with respect to an inverter for driving an electric motor (M) of a power unit of an electric vehicle according to a variation of an embodiment of the present invention.

Next, when the second DC-DC converter voltage V2 reaches the fuel cell voltage Vfc, i.e., when the second node B may be connected to the third node C, the control device 17 maintains the switching operation of the DC-DC converter 13 as shown in FIG. 13A, for example. In addition, the control device 17 switches the first switch (SW1) 14 from an opened state (i.e., a state in which the first switch is turned off) to a closed state (i.e., a state in which the first switch is turned on). At the same time, the second switch (SW2) 15 is maintained to be an opened state (i.e., turned off). Further, the battery 11 and the fuel cell stack (FC) 12 are connected in series with respect to the driving inverter 3 of the electric motor (M) 2.

Figure 13B:
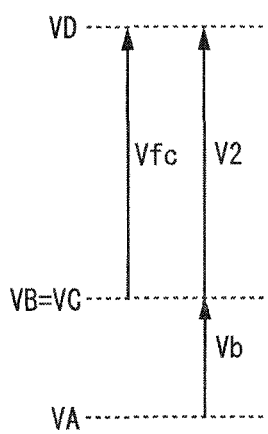
FIG. 13B is a diagram showing a condition of switching a connection between a battery and a fuel cell stack (FC) from a connection in parallel to a connection in series with respect to an inverter for driving an electric motor (M) of a power unit of an electric vehicle according to a variation of an embodiment of the present invention.

As a result, as shown in FIG. 13B for example, the electric potential VB of the second node B becomes equal to the electric potential VC of the third node C. At the same time, the electric potential VB of the second node B and the electric potential VC of the third node C becomes lower than the electric potential VA of the first node A by an amount of the battery voltage Vb.

When this connection in series is made (i.e., the second connected condition), the control device 17 maintains the switching duty of the DC-DC converter 13. The switching duty is represented by the following equation (11), for example.

As a result, as shown in the following equation (12), for example, the ratio between the fuel cell voltage Vfc of the fuel cell stack 12 and the battery voltage Vb of the battery 11 is represented by the switching duty. This ratio corresponds to the ratio between the operating point of the fuel cell stack 12 (for instance, an electronic voltage or an electronic current or an electronic power) and the operating point of the battery 11 (for instance, an electronic voltage or an electronic current or an electronic power).

(Equation 11)
$$duty = \frac{Vfc}{(Vb+Vfc)} \qquad (11)$$

(Equation 12)
$$\frac{Vb}{Vfc} = \frac{1-duty}{duty} \qquad (12)$$

Since the ratio between the operating point of the fuel cell stack 12 and the operating point of the battery 11 is represented by the switching duty, the control device 17 supplements the total consumed electric power of the load with the output power by the power supplying side such as the fuel cell stack 12 and the battery 11. In this way, the control device 17 controls the output ratio between the fuel cell stack 12 and the battery 11.

As a result, it is possible to execute various operating modes when the electric motor (M) 2 is driven and regenerated. The switching duty of the DC-DC converter 13 is controlled by setting a target electric current of the fuel cell electric current Ifc with respect to each operating mode, and by performing a feedback control so that the fuel cell electric current Ifc equals the target electric current.

The present invention is not limited to the embodiment described above. The present invention encompasses multiple variations obtained by varying the embodiment described above within the gist of the present invention. For instance, the position of the battery 11 may be replaced with the position of the fuel cell stack 12.

The invention claimed is:

1. A power unit for an electric vehicle, the power unit comprising:
   a first power source connected between a first node and a second node;
   a first switch connected between the second node and a third node;
   a second power source connected between the third node and a fourth node;
   a second switch connected between the first node and the third node; and
   a DC-DC converter connected to the second node, wherein the DC-DC converter adjusts an electric potential of the first node from the second node via the first power source by changing an electric potential of the second node by making the first node connectable to the third node, or, changes the electric potential of the second node by making the second node connectable to the third node;

an output electric power obtained from between the first node and the fourth node is supplied to an electric motor, wherein one of the first power source or the second power source is a fuel cell stack and an another one of the first power source or the second power source is a secondary battery; and a switching unit switching between a first connected condition, a second connected condition, and a third connected condition, wherein, in the first connected condition, the first node is connected with the third node by opening the first switch and closing the second switch, in the second connected condition, the second node is connected with the third node by closing the first switch and opening the second switch, in the third connected condition, the third node is disconnected from the first node and the second node by opening the first switch and opening the second switch, and the switching unit switches between the first connected condition and the second connected condition via the third connected condition.

2. The power unit for the electric vehicle according to claim 1, wherein the DC-DC converter maintains a switching operation before and after the switching operation is made between the second connected condition and the third connected condition.

3. The power unit for the electric vehicle according to claim 1, the power unit further comprising an auxiliary machine connected between the third node and the fourth node.

4. The power unit for the electric vehicle according to claim 1, wherein a low voltage side terminal of the DC-DC converter is connected to the second node;

a high voltage side terminal of the DC-DC converter is connected to the first node; and a common terminal is connected to the fourth node.

5. The power unit for the electric vehicle according to claim 1, wherein a low voltage side terminal of the DC-DC converter is connected to the second node;

a high voltage side terminal of the DC-DC converter is connected to the fourth node; and a common terminal is connected to the first node.

* * * * *